March 29, 1955
T. F. JACOBS
2,705,081
PORTABLE RAMP FOR VEHICLE CARRIERS
Filed Oct. 20, 1953
3 Sheets-Sheet 1
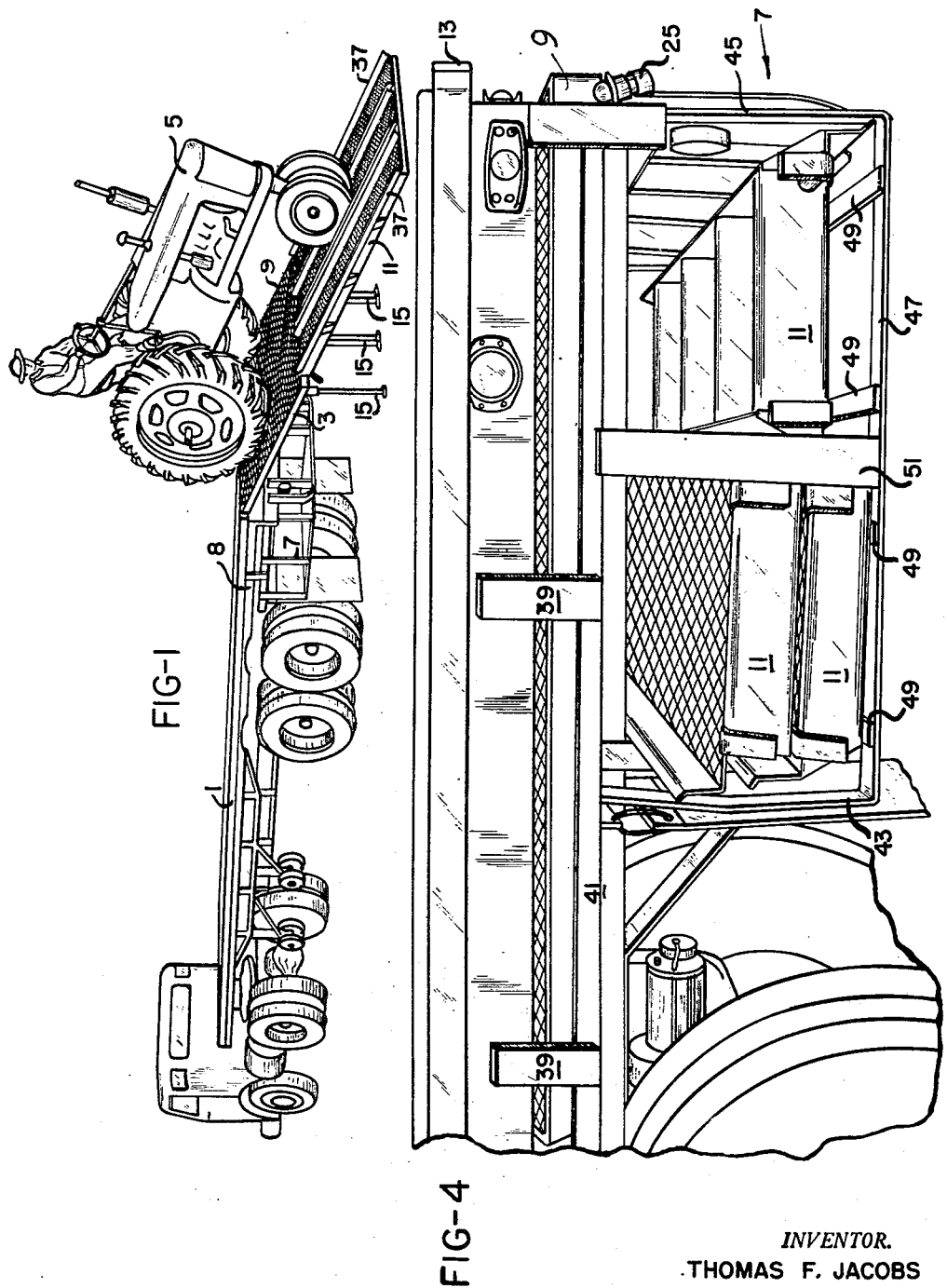
INVENTOR.
THOMAS F. JACOBS
BY Toulmin & Toulmin
ATTORNEYS March 29, 1955   T. F. JACOBS   2,705,081
PORTABLE RAMP FOR VEHICLE CARRIERS
Filed Oct. 20, 1953   3 Sheets-Sheet 2

INVENTOR.
THOMAS F. JACOBS
BY Toulmin & Toulmin
ATTORNEYS

March 29, 1955 T. F. JACOBS 2,705,081
PORTABLE RAMP FOR VEHICLE CARRIERS
Filed Oct. 20, 1953 3 Sheets-Sheet 3
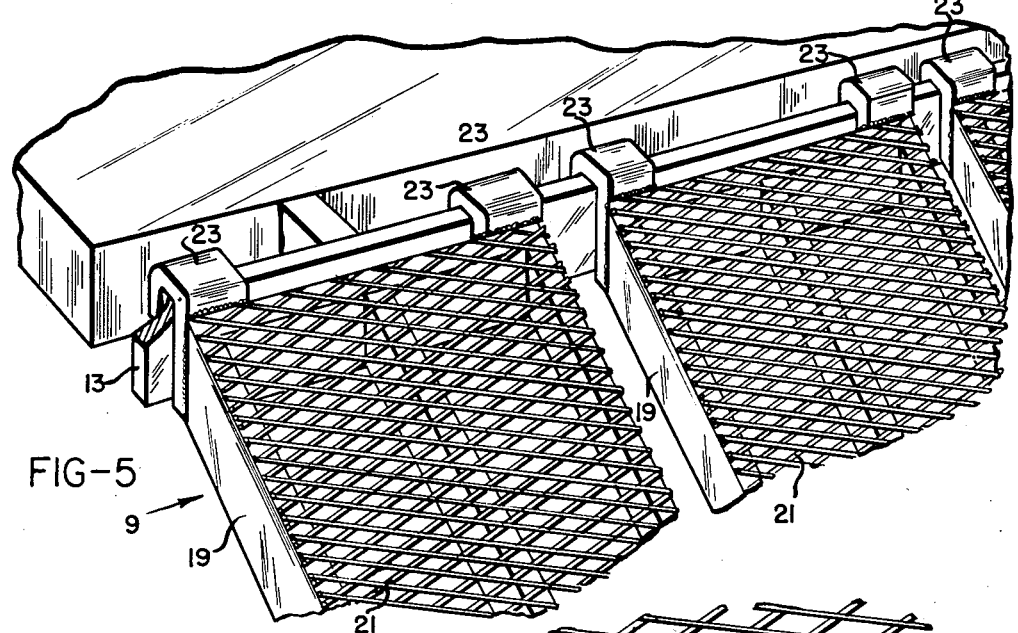
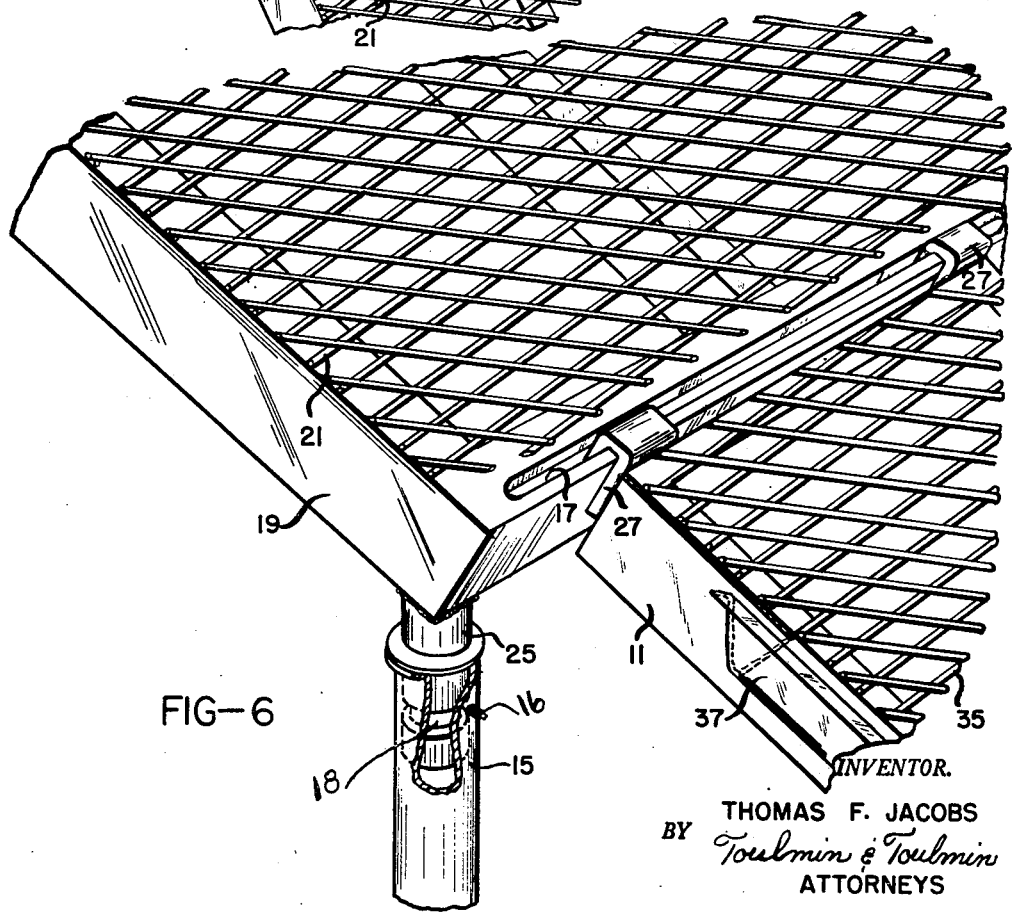
INVENTOR.
THOMAS F. JACOBS
BY Toulmin & Toulmin
ATTORNEYS

United States Patent Office 2,705,081
Patented Mar. 29, 1955

2,705,081

PORTABLE RAMP FOR VEHICLE CARRIERS

Thomas F. Jacobs, Springfield, Ohio, assignor to Kenosha Auto Transport Corporation, Springfield, Ohio, a corporation of Ohio Application October 20, 1953, Serial No. 387,259

5 Claims. (Cl. 214—85)

This invention relates to portable ramps for use with vehicle carriers; more particularly the invention is directed to a portable ramp for use with carriers of tractors.

In the transportation of vehicles, tractors and the like it is common practice to deliver the same from a production center to dealers on large carrier trucks. Normally the carrier mounts a number of tractors and the production center is usually well equipped for the loading of the tractors on the carrier. The delivery points however are very frequently not so equipped and it is then necessary to locate a suitable bank, dock or platform of a height equivalent to that of the trunk and to drive the vehicle or tractor onto the same in order to effect unloading. In many instances such a bank or platform is as much as two miles away from the store to which delivery is to be made and it is necessary to move the tractor under its own power to the store and accordingly much time is lost and considerable expense is involved.

It is a primary object of the present invention to provide a portable ramp which is a part of the equipment of the carrier truck and is adapted to be readily arranged for the unloading of vehicles directly at the dealer's place of business.

It is an important object of this invention to provide a sectional portable ramp which may be readily arranged in position by one man, for example, a driver of the carrier.

It is a further object of the present invention to provide a portable ramp the sections of which are adjustably positioned to permit of removing from the carrier vehicles having different wheel arrangement.

It is also an object of this invention to provide for the compact storage of a portable ramp in a convenient manner on the carrier truck.

It is yet another object of this invention to provide a ramp structure the surface of which is adapted for securely engaging the tires of the vehicles movable thereon and which surface does not retain water or ice to an extent sufficient to induce slippage of vehicle wheels.

It is a particular object of the present invention to provide a portable ramp secured in such a manner on the carrier truck that the sections thereof may be conveniently removed for assembly without exposing the driver to traffic conditions on the roadside of the parked carrier.

The invention will be more fully understood by reference to the following detailed description and accompanying drawings wherein:

Figure 1 is a perspective view of the carrier having a ramp in useful position with a tractor descending the same;

Figure 4 is a left side view of the rack arrangement of Figure 3 with the sections of the ramp in position;

Figure 5 is a perspective view of a portion of the structure of Figure 3 and illustrates the clamping arrangement between the carrier and the inclined ramp; and Figure 6 is a perspective view partially in section of a portion of the structure of Figure 3 illustrating the clamping arrangement between upper and lower ramp sections.

Figure 3:
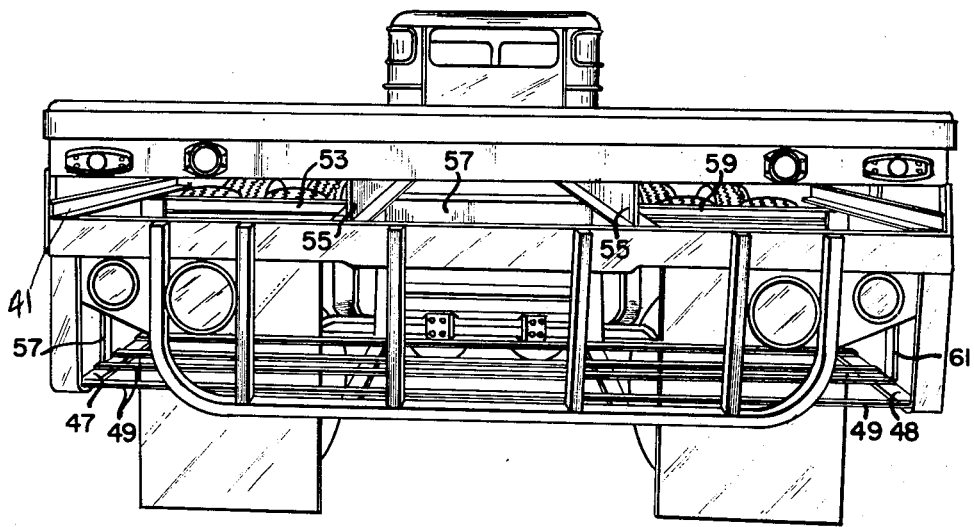
Figure 3 is a rear view of the carrier truck illustrating a rack arrangement for support and transportation of the sections of the portable ramp of Figures 1 and 2.

Referring to the drawings there is shown in Figure 1 at 1 a carrier truck having positioned at the rear end thereof a portable ramp 3 over which a tractor 5 is descending. A storage rack 7 is shown secured on the carrier truck beneath the platform 8 and behind the rear wheels of the carrier.

Figure 2:
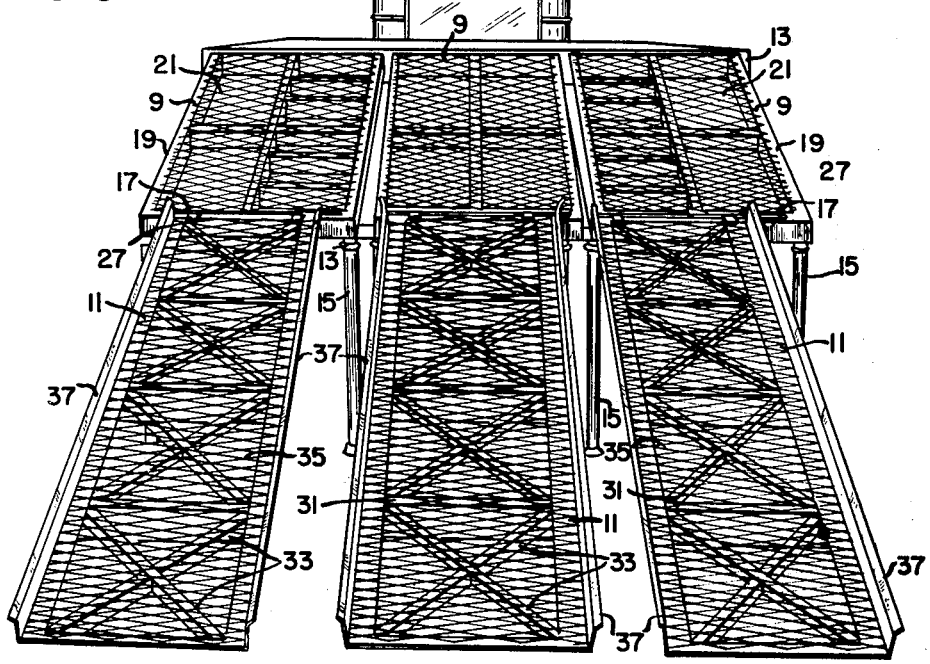
Figure 2 is a left hand end view of the ramp of Figure 1.

Referring now particularly to Figure 2 the portable ramp 3 comprises upper ramp members 9 and lower ramp members 11, the upper ramp members being rearwardly secured to a bracket 13 (Figure 5) on the carrier and being supported forwardly on legs 15, while the lower ramp members 11 are secured rearwardly in slots 17 (Figure 6) of the upper ramp members and are supported forwardly and in inclined position by the ground.

The upper ramp members 9 each comprise a rectangular frame 19 over which there is stretched and suitably secured a heavy gauge wire 21. Each frame as illustrated in Figure 5 is provided at the upper end thereof with a pair of spaced fingers 23 which in the mounted position extend over and are supported by the bracket 13. The bracket 13 is itself of greater width than the combination of the three upper ramp members 9 and these ramp members may be individually slid laterally therein to accomplish adjustment of ramp section position for vehicles having variously arranged wheel positions.

Extending below each frame 19 at the lower end thereof are a pair of flanged and grooved securing means 25 in the form of short depending arms over which legs 15 are adapted to be sleeved and securely engaged; for this purpose spring biased retractable pins 16 (Figure 6) may be carried by each leg 15 to engage in a groove as at 18.

The lower end of each frame 19 is provided with a laterally extending slot 17 as already noted and the upper ends of each of the lower ramp members 11 are provided with spaced fingers 27 which extend over the edge of the frame and engage in the slots. Each upper ramp member 9 and the slot 17 thereof is of greater width than the lower ramp member 11 and the fingers 27 together with the ramp member 11 may be slid laterally in the slot 17 for adjusting purposes.

Since each of the lower members is of a materially lesser width than each of the upper members a considerable degree of adjustment is provided and this arrangement is particularly useful in connection with unloading and loading of tractors which vary considerably in their wheel arrangements.

The lower ramp members 11 are rectangular and of substantially greater length than width and comprise a rectangular frame having cross brace members 31 and diagonally extending crossed members 33. Secured over this frame structure is a heavy wire net 35 and upwardly extending from the longitudinal edges of the frame are flanges 37.

The arrangement thus described is extremely useful as it is readily portable, easily assembled by one man, and is of relatively light weight due to the utilization of the wire mesh which also provides a non-skid feature in operation. In addition it is only required that a short space be available at the destination of the carrier truck in order to permit demounting of vehicles.

Referring now particularly to Figure 4 the rack 7 for the transportation of the ramp comprises a pair of vertical frame members 39 welded or otherwise suitably secured to the bed of the carrier and having secured thereto a horizontal frame member 41 from which there depends vertical members 43, 45. The upper horizontal member 41 and the lower horizontal member as at 47 define the height of the rack, while members 43, 45 define the length thereof.

Secured between the oppositely disposed members 47, 48 are laterally extending straps 49 which as shown in Figure 3 support the lower sections 11 of the portable ramp. A vertical member 51 (Figure 4) divides the rack into two sections and insures of secure engagement between the rack and the ramp sections in transportation.

The member 41 (Figure 3) internally of the carrier defines one way in a spacing 53 and partitioning member 55 defines a second way of the spacing which is adapted to receive an upper ramp member 9 (Figure 4). Similarly spacings 57, 59 (Figure 3) are provided to receive each of the other upper ramp members 9. When these ramp members are in position as shown in Figure 4 the securing means or depending arm 25 extends outwardly of the carrier and opposed pairs of the arms are so positioned at the rear of the carrier that they are readily available to an operatior for grasping for removing the ramp members 9 from the carrier.

In the preferred method of accomplishing the ramp positioning the legs 15 which may be either carried internally of the rack or in secure engagement with the members 25, are preferably positioned prior to the removal of the ramp members 9 from the carrier. Accordingly the operator or carrier driver may pull on the legs 15 until they are removed a sufficient distance from the truck to touch the ground and provide a support for the lower end of the ramp members, while the operator from one side tilts the upper end into position to secure the fingers 23 in the bracket 13. After one ramp is positioned it may be slid laterally slightly as desired to the most effective position. The upper members 9 are each positioned in sequence and due to the convenient nature of the structure one operator may easily handle the same.

Vertical member 61 of the rack (Figure 3) which aids in retaining the ramp sections 11 in position during transit is hinged at its lower end and is dropped by the operator to permit withdrawal of the lower ramp members 11 from the side of the carrier which may be parked for example adjacent a curb or sidewalk. These ramp members 11 are each of sufficiently light weight to be pulled to a positioned upper ramp section by one man to be secured as shown in Figure 2. The lower ramp members 11 may then be adjusted laterally as desired to accommodate the particular vehicles which are to be removed from the carrier. If the vehicles transported have several different wheel arrangements the ramps may be readily adjusted to accommodate each between demountings.

It is thus to be noted that there has been described a convenient portable ramp arrangement for the demounting of carried vehicles; that the ramp is compact and its sections may be readily nested beneath the carrier platform in transit; that the ramp may be readily assembled and positioned by one operator, and that the whole operation of demounting vehicles from carrier trucks is facilitated.

It will be understood that this invention is susceptible to modification in order to adopt it to different usages and conditions and accordingly it is desired to comprehend such modifications within this invention as may fall within the scope of the appended claims.

I claim:

1. In combination, a vehicle carrier having a platform for the support and transit of vehicles, a bracket extending across the rear end of the platform, and a sectional ramp structure comprising a plurality of upper and lower ramp sections and the structure having securing means on the upper end thereof secured to the bracket and the lower end thereof adapted to be supported by the ground, said securing means and bracket being of such construction and arrangement that the ramp sections may be adjusted laterally with respect to and substantially independently of each other.

2. In combination, a vehicle carrier and an inclined sectional ramp extending downwardly from the rear of the carrier for facilitating removal of vehicles therefrom, said ramp having sections each of relatively light weight comprising a substantially rectangular frame having wire mesh stretched thereover, said carrier having a bracket means on the rear thereof, said ramp having a plurality of upper ramp members supported by said bracket, the lower end of each said upper ramp member having a slot therein, and lower ramp members equal in number to the upper ramp members, each one of the lower members being narrower in width than the upper ramp members, each one of the lower members having fingers engaging in a said slot of one upper member and being supported by the upper member and slidable in the slot laterally with respect to the upper member, and means secured between the upper and lower ends of the inclined ramp supporting the same approximately centrally.

3. In combination, a vehicle carrier and an inclined sectional ramp extending downwardly from the rear of the carrier for facilitating removal of vehicles therefrom, said carrier having a bracket means on the rear thereof, said ramp having a plurality of upper ramp members spaced apart on said bracket, supported thereby and slidable thereon, the lower end of each said upper ramp member having a slot therein, and lower ramp members equal in number to the upper ramp members, each one of the lower members being narrower in width than the upper ramp members and having means engaging in a said slot of one upper member and being supported by the upper member, and means secured between the upper and lower ends of the inclined ramp supporting the same approximately centrally, said means comprising legs extending from beneath the lower ends of the upper ramp members supporting said inclined ramp.

4. In combination, a vehicle carrier and an inclined sectional ramp extending downwardly from the rear of the carrier for facilitating removal of vehicles therefrom, said carrier having a bracket means on the rear thereof, said ramp having a plurality of upper ramp members spaced apart on said bracket, supported thereby and slidable thereon, the lower end of each said upper ramp member having a slot therein, and lower ramp members equal in number to the upper ramp members, each one of the lower members being narrower in width than the upper ramp members and having fingers engaging in a said slot of one upper member and being supported by the upper member and slidable in the slot with respect to the upper member, and means secured between the upper and lower ends of the inclined ramp supporting the same approximately centrally.

5. In combination, a vehicle carrier and an inclined sectional ramp extending downwardly from the rear of the carrier for facilitating removal of vehicles from the carrier, said carrier having a platform and a bracket extending substantially the full width of the rear of the carrier at substantially platform level, a plurality of upper ramp members each having projecting fingers slidingly securing the same on the bracket for individual sliding movement of each upper ramp member laterally of the platform, each said upper ramp member having means defining a laterally extending slot in the lower end thereof, and lower ramp members equal in number to the upper ramp members, each one of the lower ramp members being narrower in width than the upper members and each having projecting fingers slidingly engaging in a slot of an upper ramp member for lateral movement of the lower ramp member with respect to the upper ramp member, and legs extending from beneath the lower ends of the upper ramp members supporting said inclined ramp.

References Cited in the file of this patent

UNITED STATES PATENTS

| | | |
|---|---|---|
| 2,370,427 | Sherry | Feb. 27, 1945 |
| 2,436,467 | Winter | Feb. 24, 1948 |
| 2,457,380 | Kelberer | Dec. 28, 1948 |
| 2,584,396 | Naekel | Feb. 5, 1952 |
| 2,654,492 | Pressler | Oct. 6, 1953 |

FOREIGN PATENTS

| | | |
|---|---|---|
| 384,810 | Great Britain | Dec. 15, 1932 |
| 866,913 | Germany | Feb. 12, 1953 |